(12) United States Patent
Klotz et al.

(10) Patent No.: US 7,219,944 B2
(45) Date of Patent: May 22, 2007

(54) REMOVABLE BOX TARPAULIN FOR A VEHICLE

(76) Inventors: Errol Clyde Klotz, 296 Newdale Court, North Vancouver, BC (CA) V7N 3H1; Sarah Melinda Duncan, 296 Newdale Court, North Vancouver, BC (CA) V7N 3H1

( * ) Notice: Subject to any disclaimer, the term of this patent is extended or adjusted under 35 U.S.C. 154(b) by 0 days.

(21) Appl. No.: 10/815,744

(22) Filed: Apr. 2, 2004

(65) Prior Publication Data

US 2005/0218682 A1  Oct. 6, 2005

(51) Int. Cl.
*B60R 13/01* (2006.01)

(52) U.S. Cl. ..................... 296/39.1; 105/423

(58) Field of Classification Search ............. 296/39.1, 296/39.2, 39.3, 37.1, 37.5, 37.6, 214; 105/423
See application file for complete search history.

(56) References Cited

U.S. PATENT DOCUMENTS

| | | | |
|---|---|---|---|
| 4,279,439 A | 7/1981 | Cantieri | |
| 4,877,281 A | 10/1989 | Altmann | |
| 4,893,862 A | 1/1990 | Hollenbaugh, Sr. | |
| 4,917,431 A | 4/1990 | McDonald | |
| 4,979,772 A | 12/1990 | Carey et al. | |
| 5,110,171 A | 5/1992 | Anthony | |
| 5,246,193 A | 9/1993 | Faidley | |
| 5,372,396 A | 12/1994 | Van Nahmen | |
| 5,378,034 A * | 1/1995 | Nelsen | 296/39.2 |
| 5,386,960 A | 2/1995 | O'Brien | |
| 5,419,602 A | 5/1995 | VanHoose | |
| 5,495,884 A | 3/1996 | Shikler | |
| 5,553,908 A | 9/1996 | Shink | |
| 5,570,921 A | 11/1996 | Brooker | |
| 5,584,523 A | 12/1996 | Kawaguchi | |
| 5,628,442 A | 5/1997 | Wayne | |
| 5,722,710 A | 3/1998 | Falciani | |
| 5,806,816 A | 9/1998 | Hull et al. | |
| 5,806,909 A | 9/1998 | Wise | |
| 5,927,785 A | 7/1999 | Cantrell | |
| 6,203,089 B1 | 3/2001 | Doolittle, III et al. | |
| 6,206,443 B1 | 3/2001 | Konop et al. | |
| 6,312,034 B1 | 11/2001 | Coleman, II et al. | |
| 6,536,827 B2 * | 3/2003 | Oswald et al. | 296/39.2 |
| 6,595,568 B1 | 7/2003 | Schroeder et al. | |
| 2001/0036782 A1 * | 11/2001 | Gredy | 441/129 |
| 2003/0178869 A1 * | 9/2003 | Adams | 296/39.1 |

* cited by examiner

*Primary Examiner*—Lori L. Lyjak
(74) *Attorney, Agent, or Firm*—Oyen Wiggs Green & Mutala LLP (57) ABSTRACT

This invention relates to a novel containment device which can be removably placed in the rear interior of a vehicle and used for containing sundry items. More particularly, this invention pertains to a novel flexible box tarpaulin which can be detachably installed in a vehicle and used to haul cargo without soiling the interior of the vehicle. A removable container for positioning in the interior of a vehicle which comprises: (a) a web-like member which forms an enclosure; (b) at least two securing members which removably secure the web-like member in an erect position to appropriate locations on the interior of the vehicle; and (c) a closable opening in the web-like member.

20 Claims, 6 Drawing Sheets

REMOVABLE BOX TARPAULIN FOR A VEHICLE

FIELD OF THE INVENTION

This invention relates to a novel containment device which can be removably placed in the rear interior of a vehicle and used for containing sundry items. More particularly, this invention pertains to a novel flexible box tarpaulin which can be detachably installed in a vehicle and used to haul cargo without soiling the interior of the vehicle.

BACKGROUND OF THE INVENTION

Many owners of vehicles use the rear compartments of their vehicles for hauling various types of cargo including garbage, yard trimmings, camping equipment, sports equipment and the like. Frequently, such materials are dirty and soil the interior of the vehicle. The vehicle owner must then clean the interior of the vehicle.

U.S. Pat. No. 4,877,281, Altmann et al., discloses a protective liner for covering and protecting the interior surfaces of an enclosed or partially enclosed cargo area of a vehicle. The protective liner is held in place by fittings which are permanently installed in the interior of the vehicle. The liner has a floor, walls, a roof, and possible a gate and/or rear cover. An opening is provided in the liner to allow easy access to the interior cargo area located within the liner. The opening of the liner may be closed by attaching the gate and/or rear cover. A major disadvantage of the Altmann et al. protective liner is that the fittings which hold the liner are screwed into the interior walls of the vehicle and when removed leave unsightly and permanent holes. This can detract from the appearance of the interior of the vehicle and also the resale value of the vehicle. Also, the set positions of the permanent fittings reduce flexibility and versatility because they dictate the size and position of the liner.

SUMMARY OF INVENTION

The invention is directed to a removable container for positioning in the interior of a vehicle which comprises: (a) a web-like member which forms an enclosure; (b) at least two securing members which can be removably secured to appropriate locations in the interior of the vehicle without damaging the interior and secure the web-like member in an erect position to the interior of the vehicle; and (c) a closable opening in the web-like member.

The web-like member can comprise a top panel, a pair of side panels, a bottom panel, a front panel and a rear panel. The web-like member can be formed of flexible fabric.

The removable securing devices can be suction cups. The web-like member can be secured to the suction cups by cords. The cords can be elastic.

The elastic cords can be secured to the web-like member by detachable fastening means. The elastic cords can be secured to grommets in the web-like member.

The rear panel can extend from the bottom panel of the container and can be moved to close the interior of the container. The rear panel can be removably secured in an upright position to the side panels of the container by one or more removable cords.

The web-like member can be formed in a general cuboid shape, and the horizontal adjacent edges of the pair of side panels and the top and bottom panels can overlap to form horizontal overlapping strips. Grommets can be located in the overlapping strips.

BRIEF DESCRIPTION OF DRAWINGS

In drawings which illustrate specific embodiments of the invention, but which should not be construed as restricting the spirit or scope of the invention in any way.

DETAILED DESCRIPTION OF SPECIFIC EMBODIMENTS OF THE INVENTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

The design and construction of the box tarpaulin provides a unique way for enabling a vehicle owner to removably line the interior rear compartment of a vehicle with a standard polyethylene tarpaulin configured in the form of a box, with a rear opening for enabling the vehicle owner to load garbage, yard trimmings, sports gear such as golf clubs, golf carts, hockey equipment and the like into the vehicle without soiling the interior of the vehicle. Such vehicles can include, but are not limited to mini-vans, SUV's, station wagons, hatchbacks and the like. The removable box tarpaulin according to the invention provides a simple and affordable alternative to using small towable trailers attached to the rear of the vehicle. Garbage, yard trimmings, leaves and the like can be loaded into the box tarpaulin in the rear end of the vehicle and carted away to a disposal site in a clean, quick and easy manner. The removable box tarpaulin is relatively inexpensive and if need be can be disposed of after a few uses.

Figure 1:
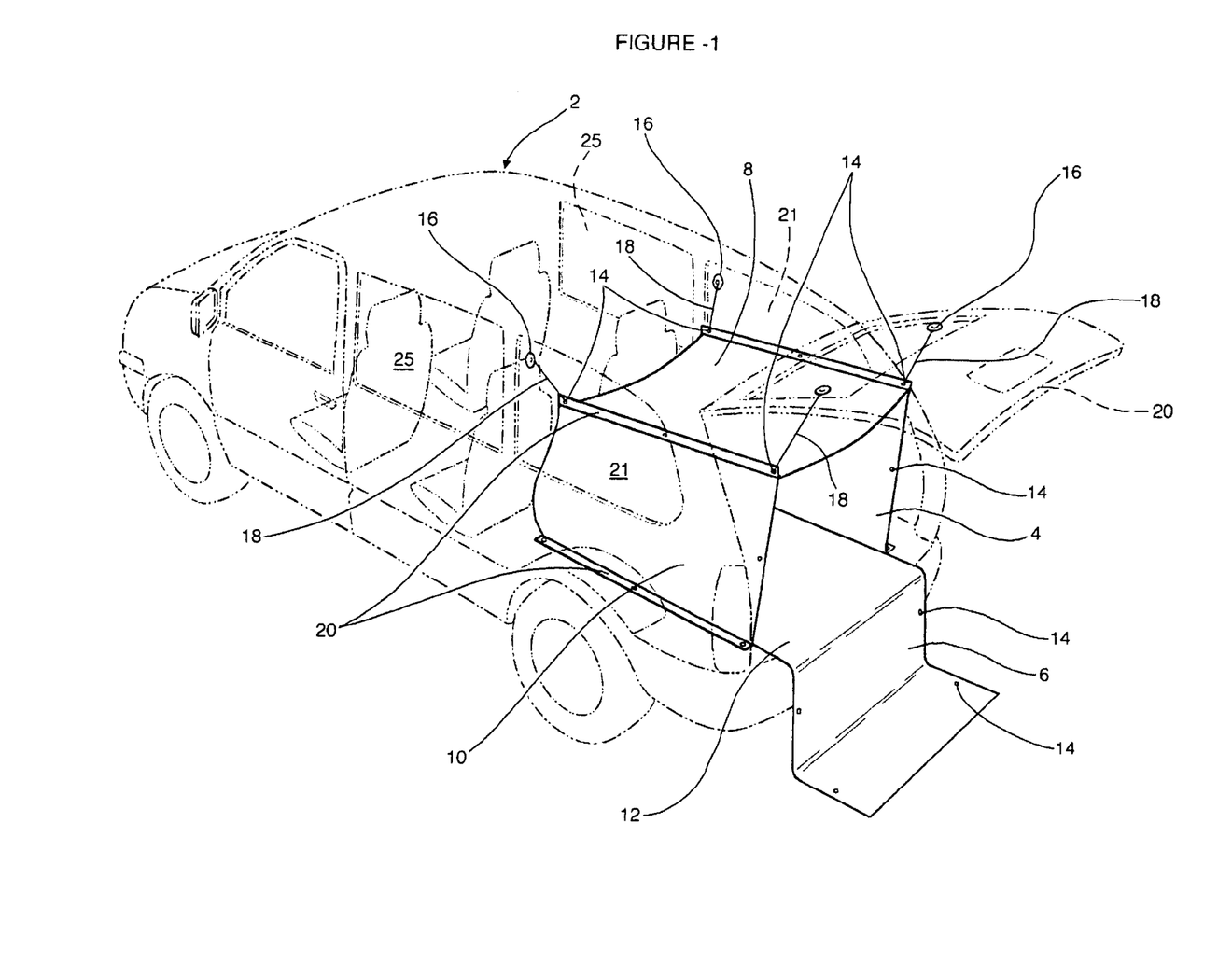
FIG. 1 illustrates an isometric view of a vehicle with a removable box tarpaulin installed in the rear interior thereof and the rear door of the vehicle open.

Referring to the drawings, FIG. 1 illustrates an isometric view of a vehicle with the removable box tarpaulin installed in the rear interior thereof and the rear door of the vehicle open. As seen in FIG. 1, the vehicle 2 is shown in dotted line configuration. The rear hatch-like door 20 is shown in an upright open position. The removable flexible box tarpaulin 4 is shown installed in the interior of the rear area of the vehicle 2 with an opening in the rear side to permit cargo to be placed in the interior of the box tarpaulin 4. The removable box tarpaulin 4 is constructed of a rear flap 6, extending from the base of the rear opening, a top panel 8, a pair of parallel side panels 10 and a bottom panel 12. The removable box tarpaulin 4 also has a front panel 13 but this is not visible in FIG. 1. The removable box tarpaulin 4 is equipped with a series of grommets 14 which are spatially deployed at various locations around the periphery of the box tarpaulin 4, including the sides of the rear flap 6 and the four overlap edges 20 on the top and bottom side edges of the tarpaulin 4.

The box tarpaulin 4, which is preferably constructed of a strong flexible material, is held in an upright hollow box-like configuration by having the front and rear grommets 14 at the two top overlapping edges 20 secured respectively to the opposing middle side windows 25, or rear side windows 21 and the rear window 24 of the rear door 22 by four suction cups 16, which are secured to the respective grommets 14 by four elastic cords 18. When loading cargo into the box tarpaulin 4, the rear flap 6 is draped downwardly and away from the rear bumper of the vehicle 2, thereby protecting it from becoming stained or damaged by cargo that might be loaded into and removed from the box tarpaulin 4.

Figure 2:
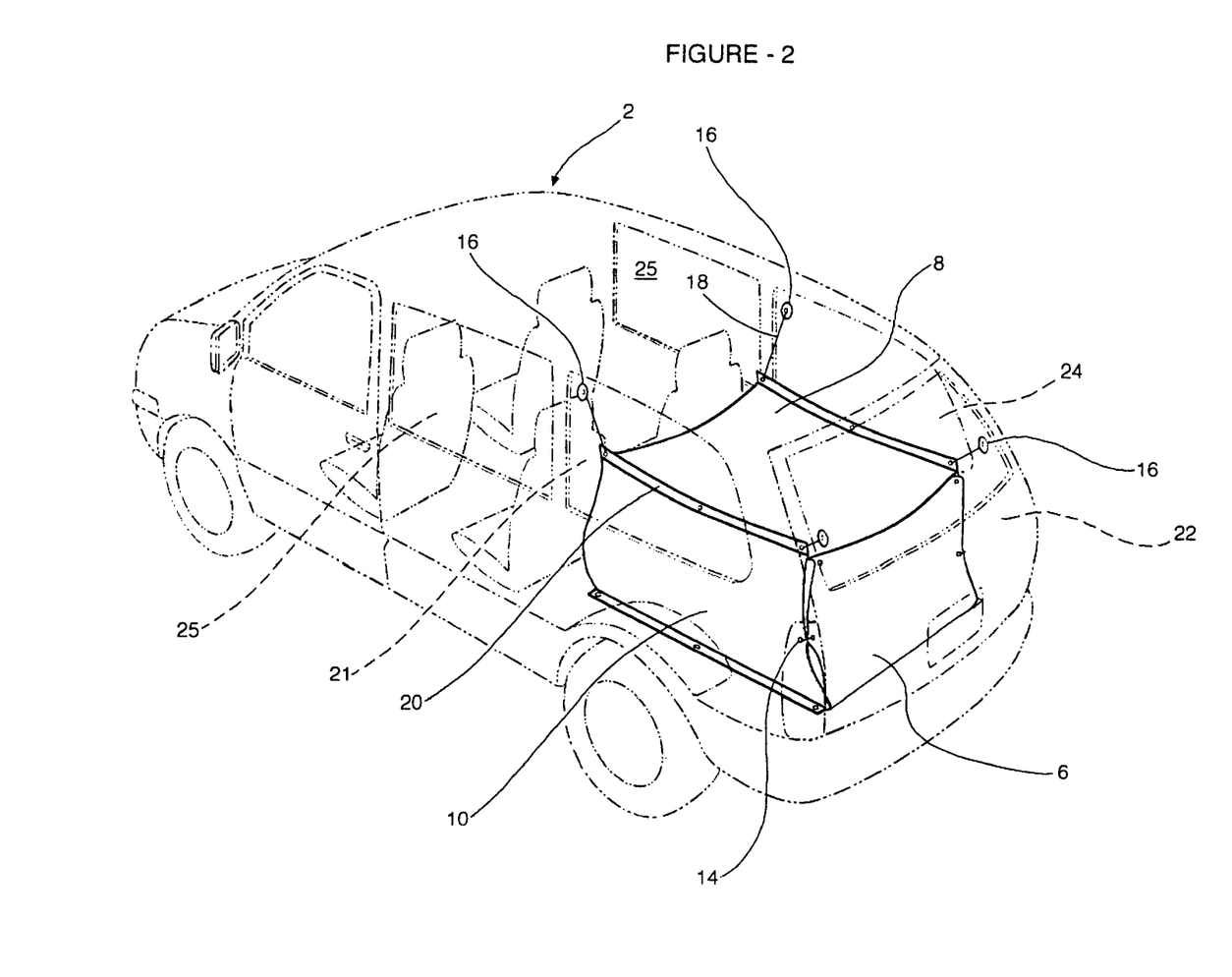
FIG. 2 illustrates an isometric view of a vehicle with the removable box tarpaulin installed in the interior thereof and the rear door of the vehicle closed.

FIG. 2 illustrates an isometric view of the vehicle with the removable box tarpaulin installed in the interior of the vehicle with the rear door closed. The middle side windows 25 are shown in dotted lines. The suction cups can be fastened to the middle side windows 25 when a larger box tarpaulin 4 is used and larger loads are handled. As seen in FIG. 2, the rear door 22 of the vehicle 2 has been lowered into a closed position. The box tarpaulin 4, which now contains the cargo that has been loaded into the interior of the box tarpaulin 4, is held inside the box tarpaulin 4 by the rear flap 6, which has been raised into an upwardly position and tied with cord, wire or twine to adjacent grommets 14 to thereby close the rear opening of the box tarpaulin 4. When the rear door 22 is dropped into a closed position, the pair of suction cups 16 that are secured to the rear window 24 are also in most cases lowered somewhat, depending of course on the size of the cargo that is held in the box tarpaulin 4, and hence the top face 8 of the box tarpaulin 4 can droop and rest at a lower elevation so that there is a sight line through the rear window 24 and the driver of the vehicle 2 can see out the rear window 24 via the rear view mirror (not shown).

Figure 3:
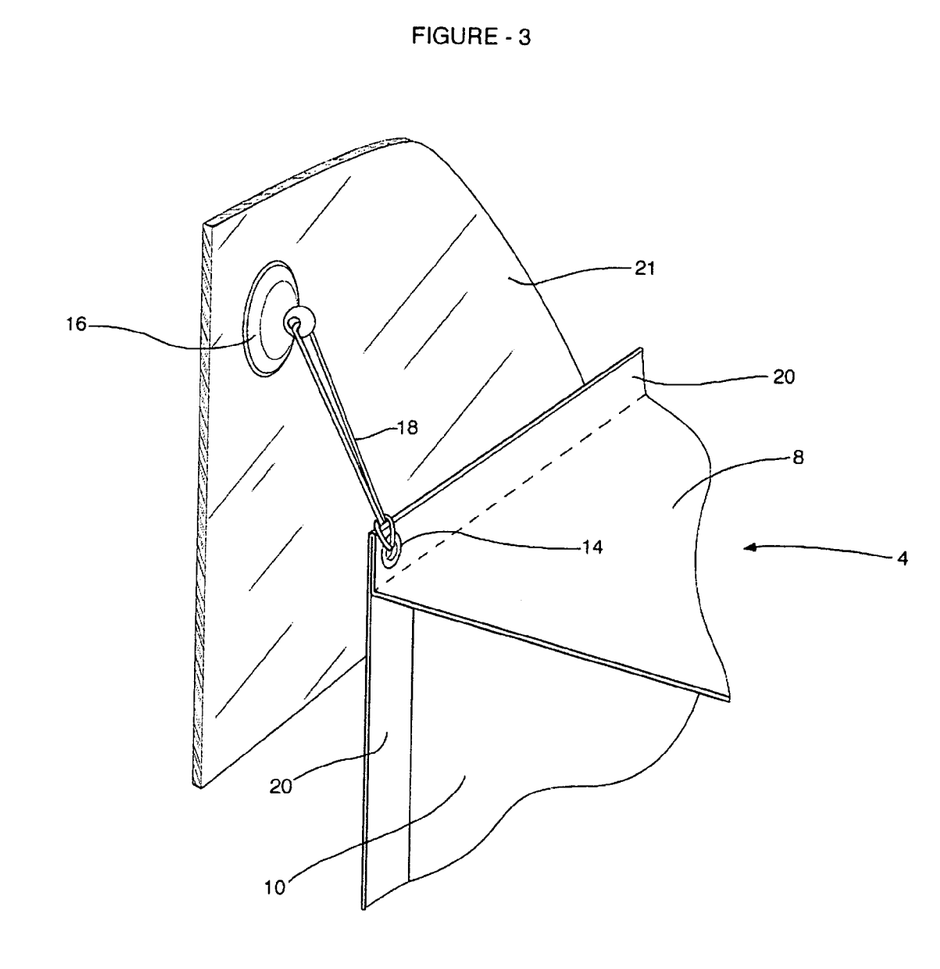
FIG. 3 illustrates a detailed isometric view of a corner of the removable box tarpaulin removably connected to the interior of a window of the vehicle.

FIG. 3 illustrates a detailed isometric view of a corner of the removable box tarpaulin 4 connected to the interior of a side window 21 of the vehicle. As seen in FIG. 3, a top corner of the top overlap edge 20 is held in an upright position by connecting the suction cup 16 to side window 21 by an elastic cord 18 which at the lower end is secured to a grommet 14. The cord 18 need not necessarily be elastic but it is preferred to provide flexibility. A suitable elastic cord 18 can be a cord with hooks at each end such as that known in the trade as a "bungee" cord, but any type of connecting member can be used. It will also be understood that while grommets 14 are shown in the drawings, such grommets are not necessarily the only way that the elastic cord 18 can be secured to a suitable location on the box tarpaulin 14. For example, instead of a cord 18 secured through a grommet, the cord can be secured to the box tarpaulin by a snap mechanism such as a "crocodile" clamp which is available in the marketplace. As far as suction cups are concerned, while they are preferred because of their ease of removable attachment to windows, it will be understood that any type of fastening means that can be removably secured to the interior of the vehicle can be used. In general, any appropriate mechanism for removably securing the box tarpaulin 4 to the interior of the vehicle 2 is appropriate for purposes of the invention.

Figure 4:
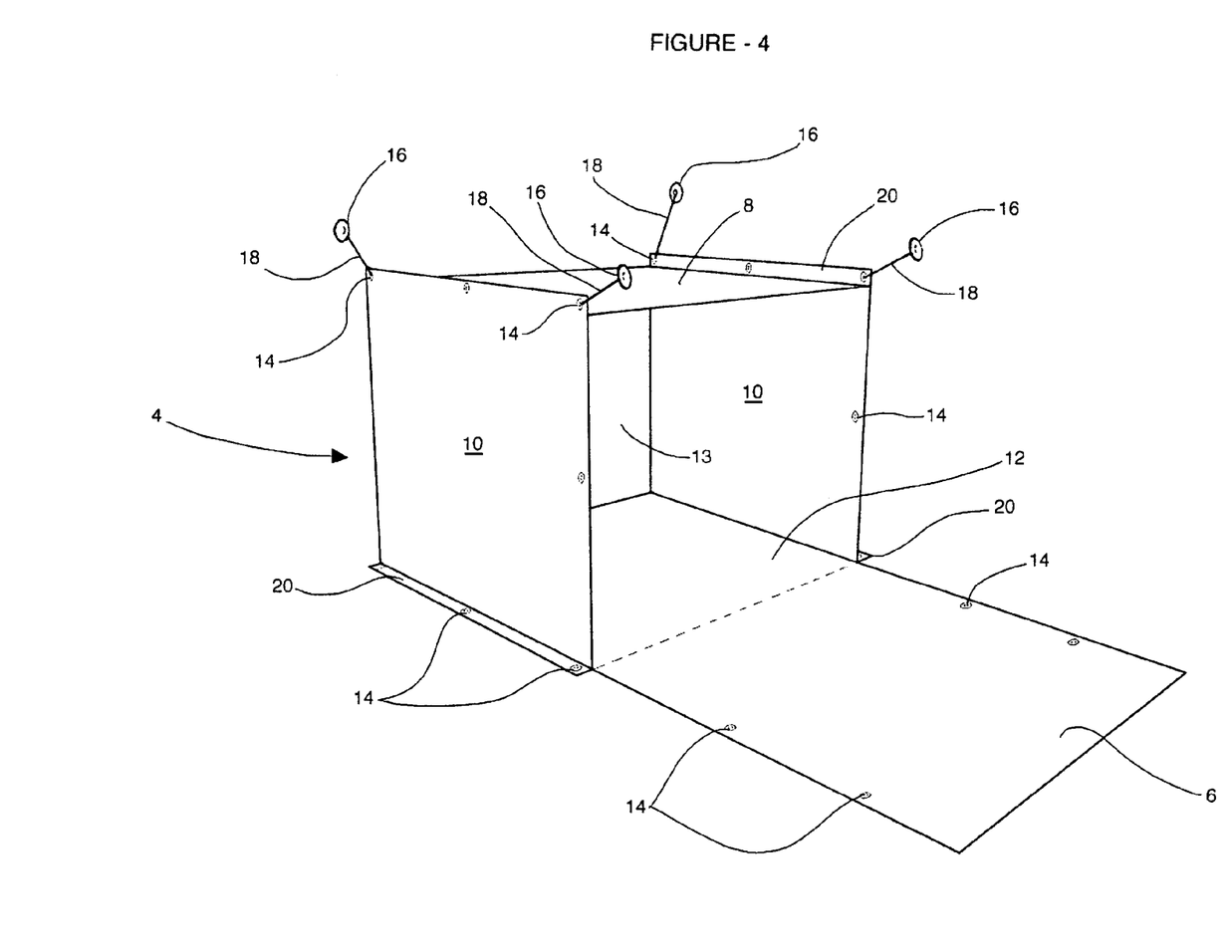
FIG. 4 illustrates an perspective view of the open-side box tarpaulin assembled in an upright configuration with a rear flap extending from the base.

FIG. 4 illustrates a perspective view of the box tarpaulin 4 assembled in an upright configuration with a rear flap 6 extending from the base of the rear opening. As seen in FIG. 4, the box tarpaulin 4 in an upright position includes a pair of parallel opposing panels faces 10, a top panel 8, a bottom panel 12 and a front panel 13, which is positioned as a forward side in the rear compartment of the vehicle. The rear flap 6 is shown extending from the bottom panel 12 and when the rear opening is open can be draped over the rear bumper of the vehicle or moved into an upright position and secured to the two sides 10 by ties or the like to close the rear opening. The top panel 8, the pair of side panels 10, and the bottom panel 12 are joined together in a manner such that parallel horizontal overlapping strips 20 are created on the upper and lower edges of the two sides 10 of the box tarpaulin 4. A series of grommets 14 are secured at spatial locations in the overlapping strips 20 so that there are several positions on the box tarpaulin 4 that can be used for securing the box tarpaulin 4 to the vehicle. The grommets 14 that are fitted into the lower overlapping strips permit the user to install the box tarpaulin 4 in an inverted position, if the occasion requires this. These features provides flexibility to the invention and enables it to accommodate different sizes of cargo and different sizes of vehicles. Further grommets 14 are spatially positioned in the peripheries of the rear flap 6 and enable the flap 6 to be tied in an upright position to the sides 10 and top 8 by suitable tying means. In most applications, the upper four exterior grommets 14 are connected to four respective elastic cords 18 which at their distal ends are connected to four suction cups 16. The other grommets 14, positioned in the bottom overlapping edges 20 and the rear flap 6, can be used as needed to fasten additional cords or the like to accommodate exceptional situations, and enable the user to invert the box tarpaulin 4 if required. The rear flap 6 can be secured into an upright position by using string, twine, rope or some other suitable removable fastening mechanism. If the owner of the vehicle wishes to remove the box tarpaulin 4 in a loaded condition from the vehicle, the edges 20 and grommets 14 are also useful in enabling an appropriate grip to be gained on the edges of the box tarpaulin 4.

Figure 5:
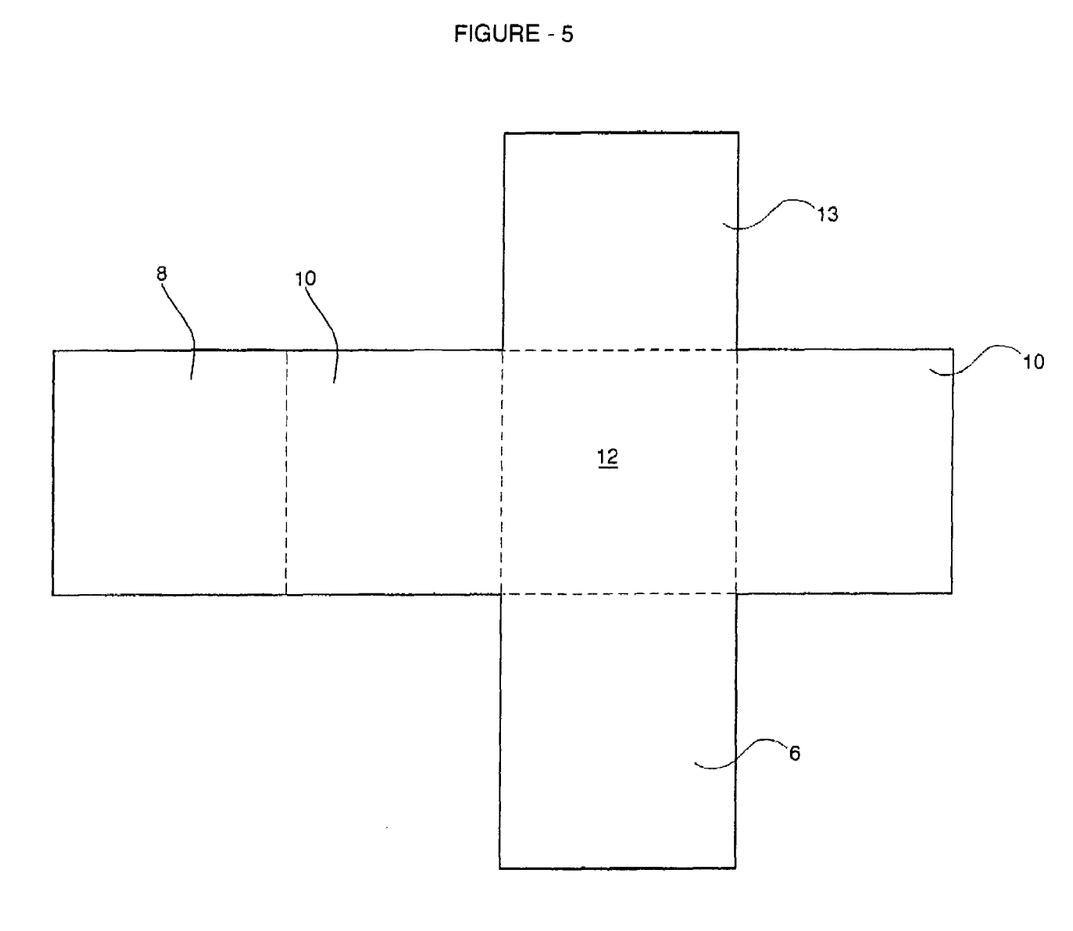
FIG. 5 illustrates a plan view of a partially assembled box tarpaulin.

FIG. 5 illustrates a plan view of a partially assembled box tarpaulin in unfolded condition. As seen in FIG. 5, the rear flap 6, the pair of side panels 10, the top panel 8, the bottom panel 12 and the front panel 13 of the box tarpaulin 4 are fastened together by appropriate stitching, heat welding, or some other suitable securing mechanism such as adhesive. The upright box tarpaulin 4 is then formed by erecting the pair of side panels 10 and the front panel 13 into a vertical position and then securing those adjacent edges and panels by sewing or gluing the top panel 8 to the respective panels. The rear flap 6 as discussed previously is not stitched to the other faces and remains in a free position.

Figure 6:
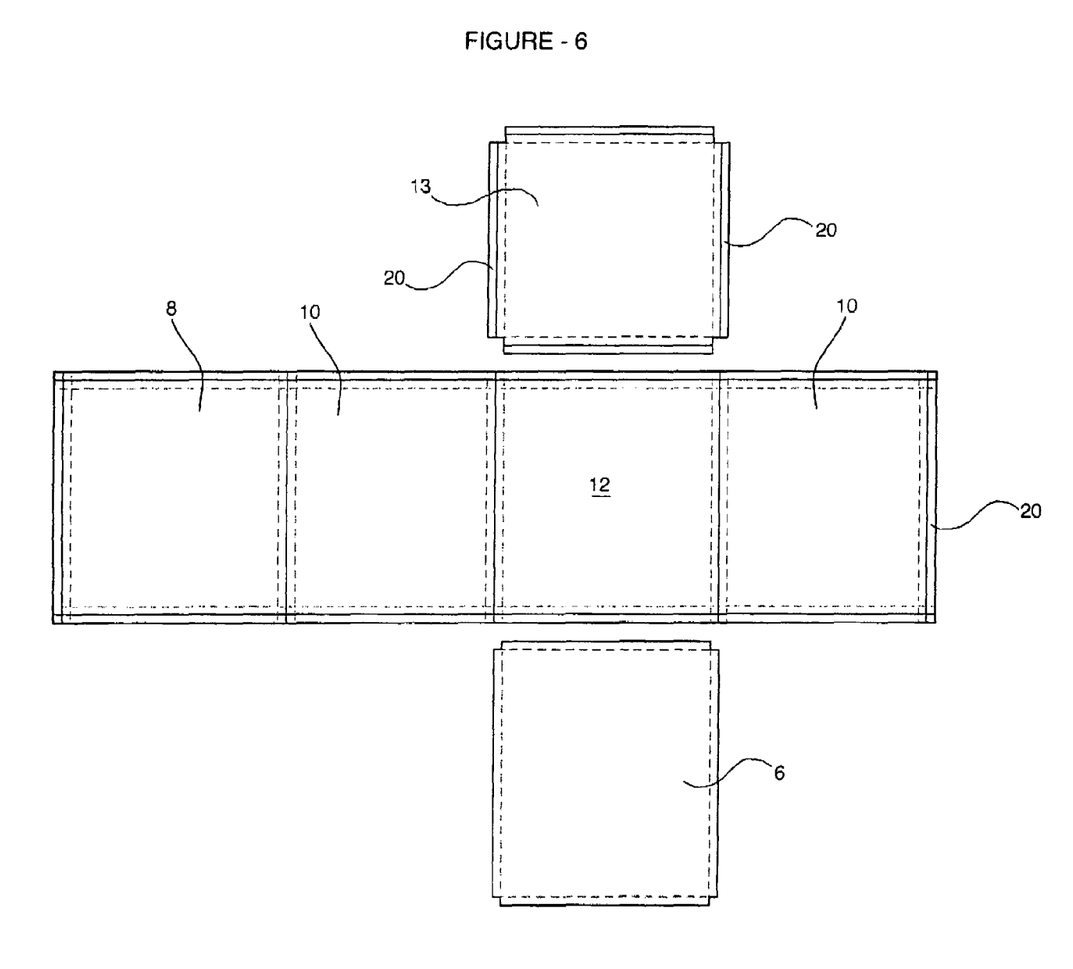
FIG. 6 is a plan view of an unassembled box tarpaulin before the components are joined together.

FIG. 6 is a plan view of an unassembled box tarpaulin before the components are joined together. As seen in FIG. 6, the top panel 8, the first side panel 10, the bottom panel 12 and the second side panel 10 are typically formed of one piece of fabric and are joined together at the location of the dotted lines in order to form the overlapping edges 20, which are illustrated in . 1, 2, 3 and 4. The front panel 13 and the rear flap 6 are typically formed of separate pieces of material and are joined to the bottom panel 12 and the other panels along the dotted lines shown in FIG. 6. The solid lines shown in FIG. 6 are typically fold lines, and the dotted lines shown in FIG. 6 are typically seam lines. It will be understood, however, that the components of the box tarpaulin can all be separate pieces if required.

To construct the box tarpaulin, tarpaulin material is seamed together to create a box shape with an open rear side and a flap extending from the base of the open side. As one means of removably fastening the erect box tarpaulin inside the rear interior of the vehicle, four suction cups attached to "bungee" cords are first hooked onto grommets at the top two front and top two back corners of the tarpaulin box. The four suction cups are then removably adhered to the front side windows and hatchback windows of the vehicle and hold the box tarpaulin in an erect open rear side manner inside the rear compartment of the vehicle.

When removably installed in the rear interior of the vehicle, the box tarpaulin creates a light protective flexible collapsible "box" or container which covers the sides, front and bottom of the interior rear portion of the vehicle. The box tarpaulin also protects the sensitive ceiling of the vehicle particularly when dealing with branches and other unwieldy cargo. This enables a person to transport virtually any cargo without worry about damaging or soiling the inside of the vehicle. The rear flap drapes over the rear bumper of the vehicle and ensures protection during loading and unloading of the box tarpaulin. During transport of the cargo, the rear flap is tied with string or cord in an upwardly position to close the rear opening and thereby prevent the cargo from spilling out the rear opening of the box tarpaulin. Once the cargo has been safely transported to the destination or disposal site, the box tarpaulin is easily swept out of hosed off, and folded for compact storage.

The box tarpaulin has a large number of applications and among other things can be used to readily transport:
  yard trimmings
  firewood
  renovation materials
  household waste
  topsoil
  bark mulch
  bedding plants; and
  recreation and sports gear.

The box tarpaulin is preferably constructed of tough water and tear resistant material such as polyethylene fabric and is fitted around its periphery with 18 metal grommets which provide flexibility in installing the box tarpaulin inside the rear end of the vehicle. The box tarpaulin attaches to the interior windows of the vehicle by any number of suitable means but suction cups connected to grommets in the fabric by elastic bungee cords are preferred.

For all-purpose use, and to fit most vehicles on the road, the box tarpaulin 4 is typically 3 ft., 6 in. high, 3 ft., 10 in. wide, and 4 ft. deep. While this size fits the rear interior of most vehicles, it will be understood that the size and shape of the box tarpaulin can be changed as required to accommodate appropriate locations and conditions. Since the box tarpaulin 4 is typically constructed of flexible collapsible fabric such as polyethylene fabric or film, the box tarpaulin 4 can act somewhat like a collapsible bag when not supported and can fold to conform to the size of the cargo that is contained in the box tarpaulin 4. If one or more of the grommets 14 are accidentally torn away, additional grommets can be installed or other mechanisms for securing the elastic cords 18 to the box tarpaulin can be used, such as clamps, hooks and the like.

It will be understood that the rear flap 6, when draped over the rear bumper of the vehicle 2, can be used somewhat as a funnel or conveyor in cases when the owner wishes to unload pea gravel, or other types of cargo from the interior of the box tarpaulin 4. In appropriate cases, the free end of the rear flap 6 can be fitted into the opening of a suitable receptacle such as a garbage can or bin and serves as a sluiceway for directing the load contents into the garbage can or bin. The rear flap 6 can also be folded to the interior of the box tarpaulin 4 to act as a double floor. When the rear flap 6 is raised to a vertical position, it is typically held in place by using appropriate twine, such as polyethylene or polypropylene twine, to secure matching grommets 14 on the flap 6 and the two sides 10 together. An advantage of the removable suction cups 16 is that they can be removably fastened at any appropriate location in the interior of the vehicle, particularly the windows, and do not leave permanent marks. There is therefore no need to drive screws or other fastening mechanism into the interior body of the vehicle, thereby destroying the appearance of the interior of the vehicle.

After cargo has been loaded into the interior of the box tarpaulin 4 through the rear opening, the suction cups 16 can be released from the appropriate windows of the vehicle, and depending on size of load, the top face 8 of the box tarpaulin can collapse over the top of the cargo, thereby leaving a line of sight for the driver of the vehicle through the rear window 24.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A removable container for positioning in the interior of a vehicle which comprises:
   (a) a web-like member which comprises a top panel, a pair of side panels, a bottom panel, a front panel and a rear panel, and forms an enclosure;
   (b) at least two suction cups which are connected to the web-like member and can be removably secured to the respective interiors of at least two windows of the vehicle and secure the web-like member in an erect position to the interior of the vehicle; and
   (c) a rear panel which extends from the bottom panel of the container and can be moved to close the interior of the container, the rear panel being removably secured in an upright position to the side panels of the container by one or more removable cords.

2. A container as claimed in claim 1 wherein the web-like member is formed of flexible fabric.

3. A container as claimed in claim 1 wherein the web-like member is secured to the suction cups by cords.

4. A container as claimed in claim 3 wherein the cords are elastic.

5. A container as claimed in claim 4 wherein the elastic cords are secured to the web-like member by detachable fastening means.

6. A container as claimed in claim 4 wherein the elastic cords are secured to grommets in the web-like member.

7. A container as claimed in claim 1 wherein the web-like member is formed in a general cuboid shape, and the horizontal adjacent edges of the pair of side panels and the top and bottom panels overlap to form horizontal overlapping strips.

8. A container as claimed in claim 7 wherein grommets are located in the overlapping strips.

9. A removable container for positioning in the interior of a vehicle which comprises:
   (a) a web-like member which forms an enclosure and comprises a top panel, a pair of side panels, a bottom panel and a front panel;
   (b) at least two suction cups which are connected to the web-like member and can be removably secured to the respective interiors of at least two windows of the vehicle and secure the web-like member in an erect position in the interior of the vehicle; and (c) a rear panel which can be moved to close an opening in the web-like member.

10. A container as claimed in claim 9 wherein the web-like member is formed of flexible fabric.

11. A container as claimed in claim 10 wherein the web-like member is secured to the suction cups by elastic cords.

12. A container as claimed in claim 11 wherein the elastic cords are secured to grommets in the web-like member.

13. A container as claimed in claim 9 wherein the rear panel extends from the bottom panel of the container and can be moved to close the interior of the container.

14. A container as claimed in claim 13 wherein the rear panel is removably secured in an upright position to the side panels of the container by one or more removable cords.

15. A container as claimed in claim 9 wherein the web-like member is formed in a general cuboid shape, and the horizontal adjacent edges of the pair of side panels and the top and bottom panels overlap to form horizontal overlapping strips.

16. A container as claimed in claim 15 wherein grommets are located in the overlapping strips.

17. A container as claimed in claim 9 wherein two of the at least two windows of the vehicle are side windows.

18. A method for installing a removable container in the interior rear compartment of a vehicle, the method comprising:

laying a bottom panel of the removable container on a bottom surface of the rear compartment;

erecting at least two side panels of the removable container such that the side panels are generally orthogonal to the bottom panel;

securing a first one of the at least two side panels to the interior of a first vehicle window; and securing a second one of the at least two side panels to the interior of a second vehicle window.

19. A method according to claim 18, wherein securing the first one of the at least two side panels to the interior of the first vehicle window comprises attaching a first suction cup connected to the first one of the at least two side panels to the interior of the first vehicle window; and securing the second one of the at least two side panels to the interior of the second vehicle window comprises attaching a second suction cup connected to the second one of the at least two side panels to the interior of the second vehicle window.

20. A method according to claim 19, comprising:

loading the removable container with a load; and releasing at least one of the first and second suction cups, thereby allowing a top panel of the removable container to collapse over the load and open a line of sight for a driver of the vehicle through a rear window of the vehicle.

* * * * *